US011901640B2

(12) United States Patent
Kobayashi et al.

(10) Patent No.: US 11,901,640 B2
(45) Date of Patent: Feb. 13, 2024

(54) ANTENNA DEVICE

(71) Applicant: Harada Industry Co., Ltd., Tokyo (JP)

(72) Inventors: Ryuji Kobayashi, Tokyo (JP); Igor Golovlev, Tokyo (JP); Takeshi Sakano, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 375 days.

(21) Appl. No.: 17/340,628

(22) Filed: Jun. 7, 2021

(65) Prior Publication Data

US 2021/0296790 A1 Sep. 23, 2021

Related U.S. Application Data

(63) Continuation of application No. PCT/JP2019/045221, filed on Nov. 19, 2019.

(30) Foreign Application Priority Data

Dec. 12, 2018 (JP) ................................. 2018-232661

(51) Int. Cl.
*H01Q 21/28* (2006.01)
*H01Q 1/32* (2006.01)
(Continued)

(52) U.S. Cl.
CPC ........... *H01Q 21/28* (2013.01); *H01Q 1/3275* (2013.01); *H01Q 11/083* (2013.01); *H01Q 21/22* (2013.01)

(58) Field of Classification Search
CPC .... H01Q 21/28; H01Q 1/3275; H01Q 11/083; H01Q 21/22; H01Q 9/32; H01Q 9/40; H01Q 1/521; H01Q 5/40
See application file for complete search history.

(56) References Cited

U.S. PATENT DOCUMENTS 9,270,019 B2 * 2/2016 Thiam .................... H01Q 1/521
2017/0093026 A1 * 3/2017 Anderson ............ H01Q 1/2291

FOREIGN PATENT DOCUMENTS

CN 208368727 U 1/2019
JP 2013-081119 A 5/2013
(Continued)

OTHER PUBLICATIONS

English translation of Written Opinion of the International Searching Authority dated Dec. 10, 2020 for the PCT application No. PCT/JP2019/045221.
(Continued)

*Primary Examiner* — Daniel D Chang
(74) *Attorney, Agent, or Firm* — PEARNE & GORDON LLP

(57) ABSTRACT

An antenna device includes an antenna base having a longitudinal direction, a first antenna element on the antenna base, and a pair of second antenna elements on the antenna base, the pair of second antenna elements being capable of transmitting and receiving radio waves in a higher frequency band than the first antenna element. In a planar view, when the antenna base is divided into four regions by a first line segment along the longitudinal direction and a second line segment orthogonal to the first line segment intersecting each other at the center point of the first antenna element, a region where one of the pair of second antenna elements is located is not adjacent to a region where the other of the pair of second antenna elements is located.

18 Claims, 9 Drawing Sheets

(51) Int. Cl.

| | |
|---|---|
| ***H01Q 11/08*** | (2006.01) |
| ***H01Q 21/22*** | (2006.01) |

(56) References Cited

FOREIGN PATENT DOCUMENTS

| | | | |
|---|---|---|---|
| JP | 2017-228860 | A | 12/2017 |
| WO | 2014/072683 | A1 | 5/2014 |
| WO | 2015/107983 | A1 | 7/2015 |
| WO | 2018/180627 | A1 | 10/2018 |

OTHER PUBLICATIONS

International Search Report issued in Patent Application No. PCT/JP2019/045221 dated Feb. 10, 2020.
Written Opinion issued in Patent Application No. PCT/JP2019/045221 dated Feb. 10, 2020.
Japanese Office Action issued in Japanese Patent Application No. 2020-559882 dated Mar. 22, 2022.

* cited by examiner

ANTENNA DEVICE

CROSS REFERENCE TO RELATED APPLICATIONS

This application is based on and claims the benefit of priority from the prior Japanese Patent Application No. 2018-232661, filed on Dec. 12, 2018, and PCT Application No. PCT/JP2019/045221 filed on Nov. 19, 2019, the entire contents of which are incorporated herein by reference.

FIELD

An embodiment of the present invention relates to a vehicle-mounted antenna device.

BACKGROUND

Conventionally, as an antenna device to be mounted on a vehicle or the like, a low-profile antenna device to be mounted on a roof of a vehicle is known. Such an antenna device has a structure in which an antenna element and a circuit substrate for communication are compactly housed in a closed space composed of a base material and cover material. In addition to a TV signal and a radio signal, recent vehicle-mounted antenna devices need to receive signals in various frequency bands such as a GNSS (Global Navigation Satellite System) signal and an ETC (Electronic Toll Collection System) signal.

For the above reason, in recent years, a multi-band antenna device equipped with a plurality of types of antenna elements corresponding to different frequency bands has become mainstream. For example, U.S. Pat. No. 9,270,019 discloses an antenna device having two patched antennas, two cellular antennas, and a DSRC (Dedicated Short Range Communications) antenna to support signals in various frequency bands.

SUMMARY

An antenna device according to an embodiment of the present invention includes an antenna base having a longitudinal direction, a first antenna element on the antenna base, and a pair of second antenna elements on the antenna base, the pair of second antenna elements being capable of transmitting and receiving radio waves in a higher frequency band than the first antenna element. In a planar view, when the antenna base is divided into four regions by a first line segment along the longitudinal direction and a second line segment orthogonal to the first line segment intersecting each other at the center point of the first antenna element, a region where one of the pair of second antenna elements is located is not adjacent to a region where the other of the pair of second antenna elements is located.

An antenna device according to an embodiment of the present invention includes an antenna base having a longitudinal direction, a first antenna element on the antenna base, and a pair of second antenna elements on the antenna base, the pair of second antenna elements being capable of transmitting and receiving radio waves in a higher frequency band that is partially or fully higher than the first antenna element. In a planar view, when the antenna base is divided into four regions by a first line segment along the longitudinal direction and a second line segment orthogonal to the first line segment intersecting each other at the center point of the first antenna element, a region where one of the pair of second antenna elements is located is not adjacent to a region where the other of the pair of second antenna elements is located.

when four regions are further divided into a plurality of regions by other line segments passing through the center point, a region in which one of the pair of second antenna elements is located and a region in which the other of the pair of second antenna elements is located may be symmetrically located with respect to the center point.

In a planar view, each of the pair of second antenna elements is preferably located outside of a circle having a diameter equal to the length of the first antenna element along the first line segment.

The first antenna element may be an antenna element extending in the longitudinal direction.

The height of the highest point at the upper edge of each of the pair of second antenna elements is preferably between the lowest and highest points of the first antenna element, and the height of the lowest point at the upper edge of each of the pair of second antenna elements is preferably below the lowest point of the first antenna element with respect to the antenna base.

Each of the pair of second antenna elements is preferably not overlapped by the first antenna element in a side view from the direction along the second line segment.

In a planar view, each of the pair of second antenna elements may have a surface curving away from the first antenna element.

Each of the pair of second antenna elements may be a tapered antenna.

Each of the pair of second antenna elements may transmit and receive radio waves in the same frequency band as each other.

The first antenna element may be an antenna element receiving circularly polarized signals.

The pair of second antenna elements may be used for MIMO (Multiple Input Multiple Output) (hereinafter simply referred to as "MIMO").

The above antenna device may further have support members each supporting each of the pair of second antenna elements. Each of the support members may be fixed to at least three fixing points including a first fixing point, a second fixing point and a third fixing point. In a planar view, the first fixing point in a support member supporting one of the pair of second antenna elements may be located on a side on which the center of gravity of one of the pair of second antenna elements exists with respect to one of the pair of second antenna elements. The first fixing point may be located on an extension of a line segment connecting a power supply point of one of the pair of second antenna elements and the center of gravity.

In a planar view, the first fixing point in a support member supporting one of the pair of second antenna elements is located on a side of the inner curved surface (second surface **242*a*-2 in FIG. 12**B) of one of the pair of second antenna elements with respect to one of the pair of second antenna elements.

In a planar view, a line segment connecting the first fixing point and the second fixing point and a line segment connecting the first fixing point and the third fixing point may intersect with one of the pair of second antenna elements.

Effect of Invention

According to an embodiment of the present invention, without requiring an isolator, it is possible to ensure isolation of a plurality of antenna elements constituting the antenna device.

DESCRIPTION OF THE EMBODIMENTS

Figure 1:
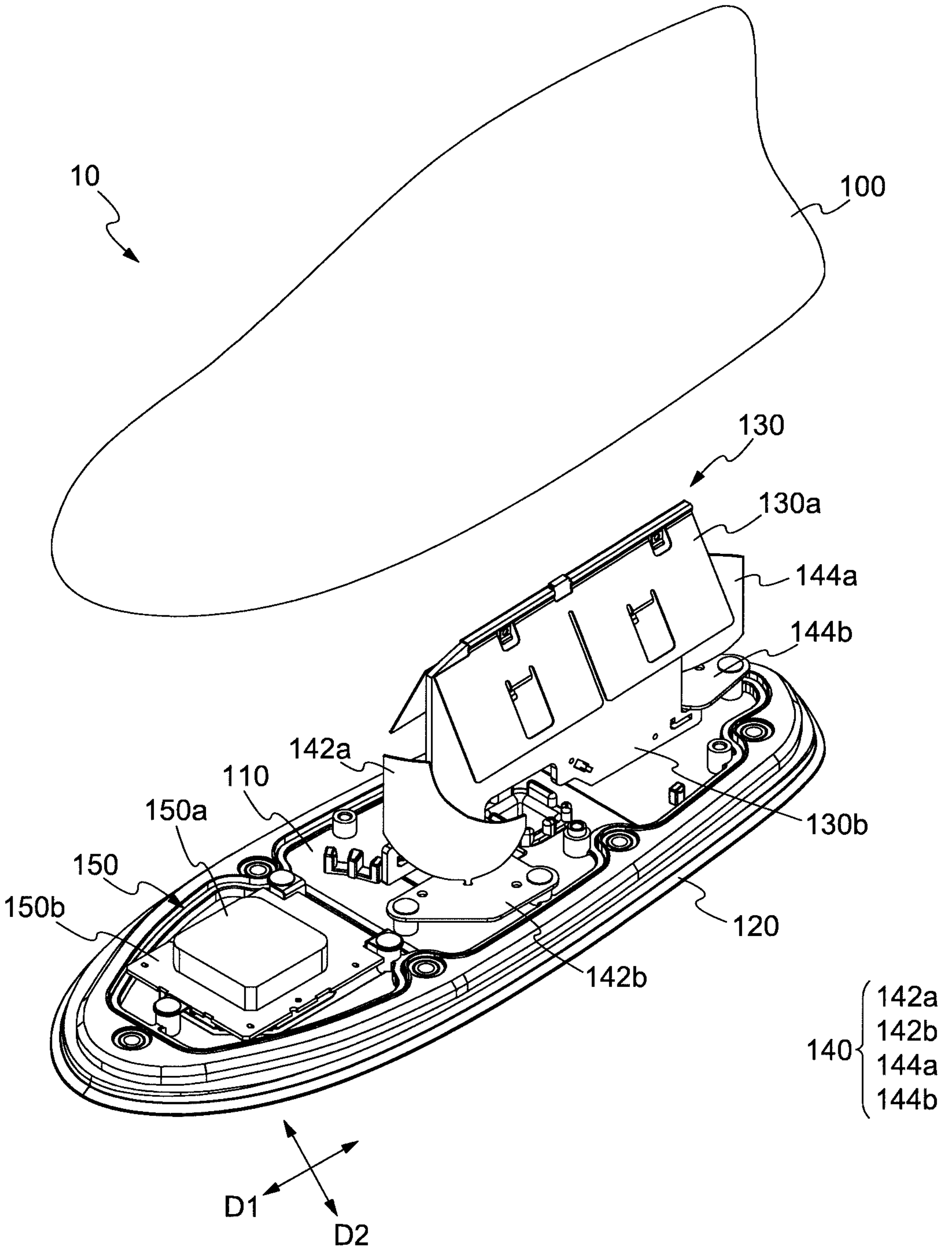
FIG. 1 is an exploded perspective view showing an internal configuration in an antenna device of the first embodiment.

The antenna device described in the background art has a structure in which a cellular antenna is arranged in the vicinity of the center behind the device, and two DSRC antennas are arranged on both sides of the cellular antenna. With such a configuration, a distance between the cellular antenna and each DSRC element, and a distance between the cellular antenna and the DSRC elements are short, between the three antennas, it is impossible to ensure isolation from each other. Therefore, in the antenna device described in the background art, in order to ensure the isolation, a structure in which a circuit substrate composed of Teflon (registered trademark) is equipped with an isolator composed of a conductor is provided. However, the circuit substrate made of Teflon is expensive, and the antenna device described in the background art is disadvantageous in terms of cost.

One of the issues of the present invention is to ensure the isolation of the plurality of antenna elements constituting the antenna device without requiring an isolator.

Embodiments of the present invention will be described below with reference to the drawings. However, the present invention can be embodied in many different forms and should not be construed as limited to the description of the following examples. In the drawings referred to in the following embodiments, the same portions or portions having similar functions are denoted by the same reference numerals, and a repetitive description thereof may be omitted.

In this specification, for convenience of description, the term “up” or “down” is used in some cases, but in a state where the antenna device is mounted on a vehicle, the direction from the vehicle toward the antenna device is set to “up” and the opposite direction is set to “down”. The terms “front,” “rear,” “left,” or “right” may be used, but the direction of travel of the vehicle is “front,” and the opposite direction is “rear.” Further, the left side is set to “left” and the right side is set to “right” in the traveling direction of the vehicle.

First Embodiment (Configuration of Antenna Device)

An internal configuration of an antenna device 10 of the first embodiment will be described with reference to FIGS. 1 to 5. The antenna device 10 is an antenna device mounted on a roof of a vehicle. Specifically, the antenna device 10 is a streamlined antenna device which becomes thinner toward the front. The antenna device of such a shape is generally referred to as a shark fin antenna. The present embodiment will be described with reference to a vehicle-mounted antenna device to be mounted on a roof of a vehicle. However, the place where the antenna device is mounted is not limited to a roof of a vehicle. For example, in addition to a vehicle roof, the antenna device 10 may be mounted on a spoiler, a trunk cover, or the like.

Figure 2:
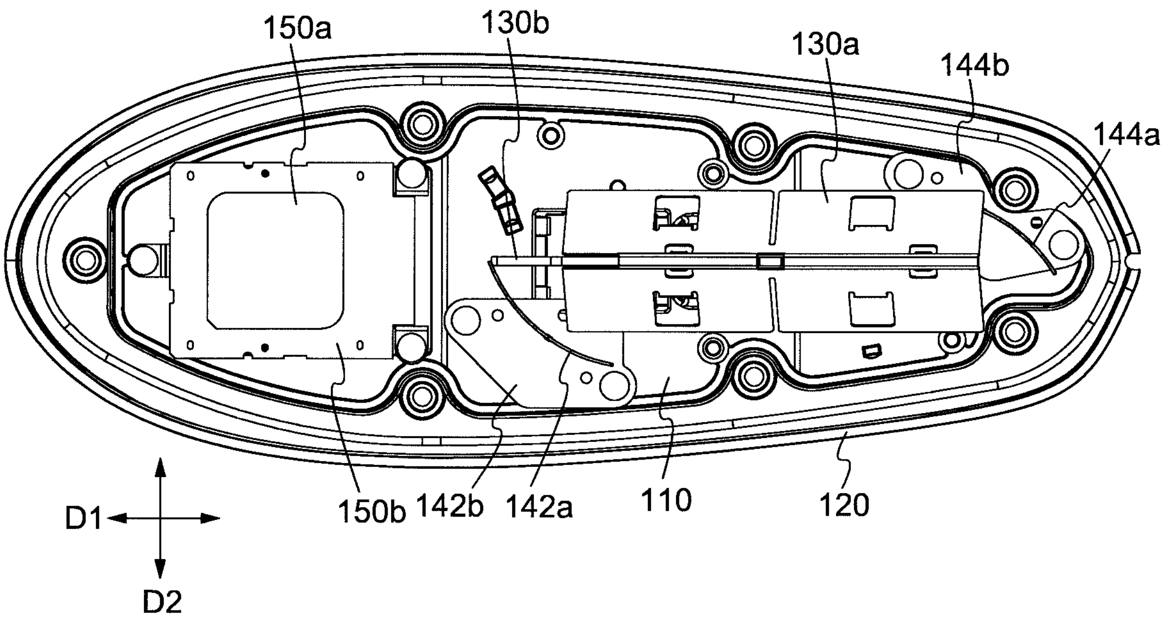
FIG. 2 is a plan view showing an internal configuration in an antenna device of the first embodiment.
Figure 3:
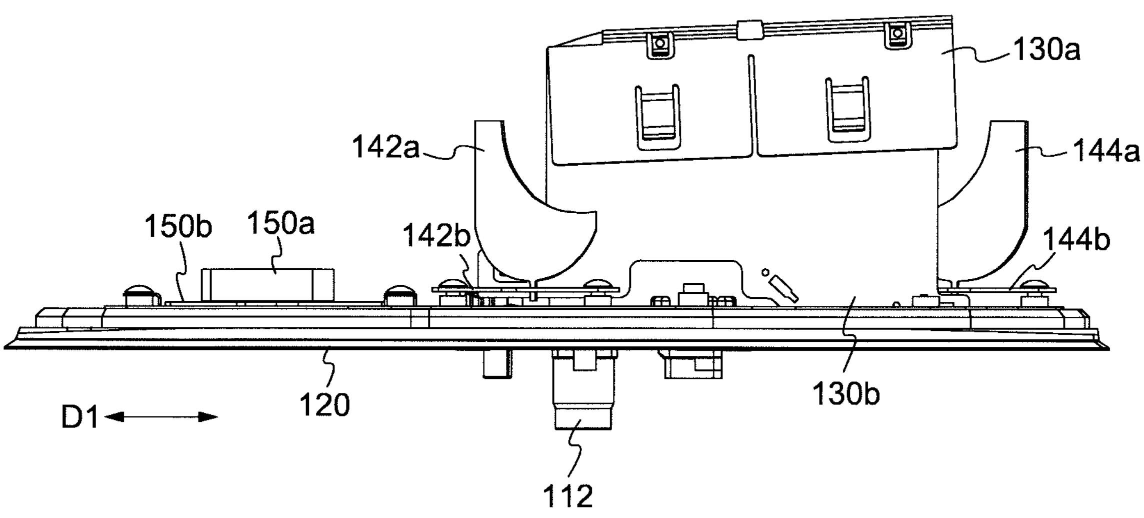
FIG. 3 is a left side view showing an internal configuration in an antenna device of the first embodiment.
Figure 4:
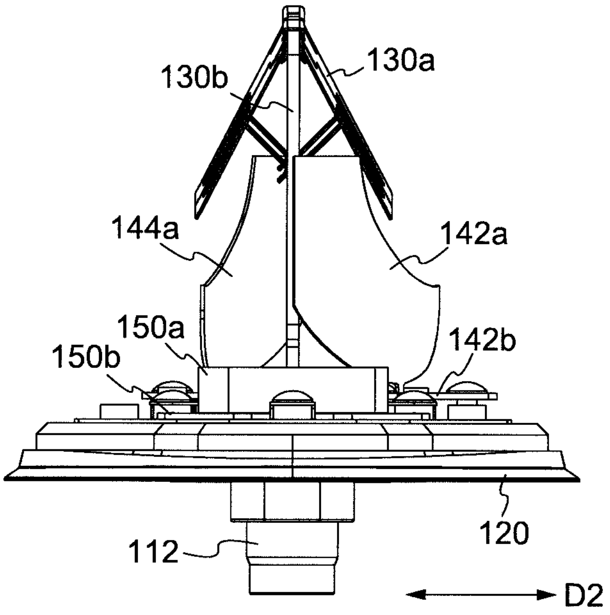
FIG. 4 is a front view showing an internal configuration in an antenna device of the first embodiment.
Figure 5:
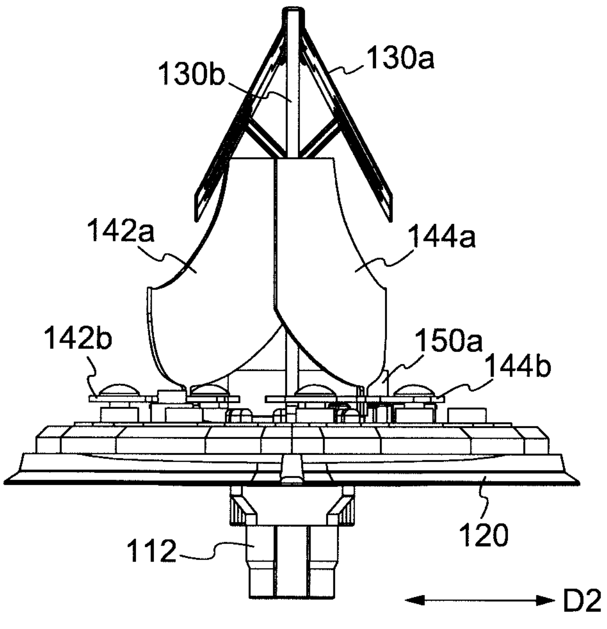
FIG. 5 is a rear view showing an internal configuration in an antenna device of the first embodiment.

FIG. 1 is an exploded perspective view showing an internal configuration of the antenna device 10 according to the first embodiment. FIGS. 2 to 5 show the internal configuration of the antenna device 10 of the first embodiment, respectively. Specifically, FIG. 2 is a plan view showing the internal configuration in the antenna device 10 of the first embodiment. FIG. 3 is a left side view showing an internal configuration in the antenna device 10 of the first embodiment. FIG. 4 is a front view showing an internal configuration in the antenna device 10 of the first embodiment. FIG. 5 is a rear view showing an internal configuration in the antenna device 10 of the first embodiment.

In FIG. 1, the antenna device 10 includes an antenna case 100, an antenna base 110, a base pad 120, a first antenna part 130, a second antenna part 140, and a third antenna part 150. In the present embodiment, an example in which the third antenna part 150 is provided in front of the antenna device 10. However, the third antenna part 150 may be omitted.

The antenna case 100 is, for example, a cover material made of a radio-wave transparent synthetic resin. The antenna case 100 covers the first antenna part 130, the second antenna part 140, and the third antenna part 150, which is fixed to the antenna base 110 by screwing or the like. As a result, the first antenna part 130, the second antenna part 140, and the third antenna part 150 are housed in a closed space formed by the antenna case 100 and the antenna base 110. At this time, since the base pad 120 is sandwiched between the antenna case 100 and the antenna base 110, the antenna case 100 and the antenna base 110 can be fitted without a gap. As a result, the first antenna part 130, the second antenna part 140, and the third antenna part 150 are protected from external pressures, impacts, water, dust, and the like.

In FIGS. 1 and 2, the antenna base 110 is a substantially oval metal member having D1 direction as the longitudinal direction. D1 direction includes the moving direction of the antenna device 10 (i.e., the moving direction of a vehicle). That is, the direction from the first antenna part 130 to the third antenna part 150 along D1 direction is the moving direction of the antenna device 10. D2 direction is a direction orthogonal to D1 direction, the lateral direction of the antenna device 10.

As shown in FIGS. 3 to 5, a bolt part 112 for attaching the antenna device 10 to a vehicle protrudes downward from the bottom surface of the antenna base 110.

The base pad 120 is a member made of, for example, rubber, elastomer, or the like. In this embodiment, covering an edge of the antenna base 110 with an outer peripheral portion of the base pad 120, when assembling the antenna device 10, it is a structure sandwiching the base pad 120 with the antenna case 100 and the antenna base 110. The contour of the antenna base 110 substantially coincides with the contour of the edge of the antenna case 100. Therefore, by fitting both the antenna case 100 and the antenna base 110 through the base pad 120 without a gap, it is possible to form the closed space described above. Since the bottom surface of the base pad 120 is located below the antenna base 110, when mounting the antenna device 10 to a vehicle, the base pad 120 is in close contact with a roof of the vehicle. As a result, moisture and dust can be protected from entering from the outside of the antenna device 10.

The first antenna part 130 is a part having a function of receiving and amplifying AM/FM signals. The first antenna part 130 includes a first antenna element **130*a* and a first circuit substrate 130*b* arranged on the antenna base 110. The first antenna element 130*a* is formed of an umbrella-shaped flat conductor and functions as an antenna for receiving AM/FM signals. The first circuit substrate 130*b* supports the first antenna element 130*a* and includes an amplifier circuit (not shown) amplifying AM/FM signals received by the first antenna element 130*a*. The first antenna element 130*a* is arranged on the first circuit substrate 130*b*** and is connected to the amplifier circuit and the like described above by wirings (not shown).

As shown in FIGS. 1 to 3, the first antenna part 130 is arranged substantially in the center behind the antenna base 110. In the present embodiment, the first antenna element **130*a* and the first circuit substrate 130*b* constituting the first antenna part 130 are both formed of a member whose longitudinal direction is D1 direction. That is, the first antenna element 130*a* and the first circuit substrate 130*b* extend in the longitudinal direction of the antenna base 110. The first circuit substrate 130*b* is fixed to a support member (not shown) provided on the antenna base 110 by screwing or the like and is held substantially orthogonal to the antenna base 110**.

In the present embodiment, an example in which the first antenna part 130 is an antenna for receiving AM/FM signals is shown. However, the present invention is not limited thereto, the first antenna part 130 may be, for example, a composite antenna for receiving AM/FM/DAB (Digital Audio Broadcast) signals.

The second antenna part 140 is arranged on the antenna base 110 and includes a second antenna element **142*a* and a second circuit substrate 142*b*, and a second antenna element 144*a* and a second circuit substrate 144*b*. Specifically, the second antenna part 140 of the present embodiment is, for example, a cellular antenna compatible with the so-called 5G (fifth-generation mobile communication system) that transmits and receives radio waves in the frequency band 699 MHz to 5.9 GHz. However, the second antenna part 140** may be a cellular antenna compatible with 3G (third-generation mobile communication system), 4G (fourth-generation mobile communication system), or C-V2X (Cellular Vehicle to Everything) that transmits and receives radio waves of several hundred MHz to several GHz.

When the second antenna part 140 is used as a cellular antenna, as shown in FIG. 1, it is preferable to use a tapered antenna as the second antenna elements **142*a* and 144*a***. A tapered antenna refers to an antenna element having a surface that is processed to gradually extend upward from a power supply point. Such tapered antenna has the advantage of being able to compatible with signals in a wide frequency band.

Incidentally, a cellular antenna compatible with 5G needs to transmit and receive radio waves in the higher frequency band of several GHz, because ensuring high-speed communication is prioritized. Therefore, in the present embodiment, a technique called MIMO (multiple-input and multiple-output) that allows high-speed communication is used with respect to the second antenna part 140. That is, in the present embodiment, one pair of second antenna elements **142*a* and 144*a*** cooperates and is used as a MIMO element.

In the second antenna part 140 using the MIMO, the second antenna elements **142*a* and 144*a* are configured to transmit and receive radio waves in the same frequency band and divide desired information and transmit in a multiplexed manner. However, the second antenna elements 142*a* and 144*a* are not limited to those that transmit and receive radio waves in a frequency band whose upper limit and lower limit are completely the same. That is, as long as it can function as an antenna element used in the MIMO, there is no issue even if the frequency band to transmit and receive is slightly shifted. The number of antenna elements used in the MIMO is not limited to two, and it is also possible to three or more. That is, in the present embodiment, it is sufficient that the second antenna part 140** includes at least two antenna elements, i.e., one pair of antenna elements.

Here, to utilize the high-speed communication by the MIMO, it is essential to lower the correlation of the respective antenna elements. Generally, it is known that the better the isolation of the respective antenna elements, the lower the correlation and the better the communication speed of the MIMO is kept. In other words, to keep the good communication speed of the MIMO, it is effective to ensure the isolation of the respective antenna elements. Therefore, to realize the MIMO enabling high-speed communication by using the omnidirectional second antenna elements **142*a* and 144*a*, it is desirable to reduce the correlation of the second antenna elements 142*a* and 144*a*** and to secure the isolation.

A low correlation between a plurality of antenna elements usually means that each antenna element's radio wave radiation pattern is different, respectively. That is, when the plurality of antenna elements used in the MIMO radiates radio waves so as to cover the space complementarily, it can be said that the correlations of the respective antenna elements are low.

Therefore, in the present embodiment, the first antenna part 130 that receives radio waves (here, AM/FM signals) in a lower frequency band than the second antenna part 140 is arranged between the second antenna element 142*a* and the second antenna element 144*a* used for the MIMO. Thus, in the present embodiment, the correlation coefficient of the second antenna elements 142*a* and 144*a* is reduced. That is, by intentionally making the radiation patterns of the second antenna elements 142*a* and 144*a* different from each other, the correlation between them is lowered, and the isolation is secured.

As shown in FIGS. 1 to 5, in the antenna device 10 of the present embodiment, the second antenna elements 142*a* and 144*a* are arranged on both left and right sides of the first antenna element 130*a*. Specifically, the second antenna element 142*a* is arranged obliquely to the left front of the first antenna element 130*a*, and the second antenna element 144*a* is arranged obliquely to the right rear of the first antenna element 130*a*.

The reason for this arrangement is to house the first antenna part 130 and the second antenna part 140 compactly in the closed space formed by the antenna case 100 and the antenna base 110, and to secure the isolation of the second antenna elements 142*a* and 144*a* without providing isolators as in the prior art. Details of this configuration will be described later.

The second circuits substrates 142*b* and 144*b* support the second antenna elements 142*a* and 144*a*, respectively, and include matching elements (not shown) for matching the impedance of the output ends and cables of the second antenna elements 142*a* and 144*a*. However, if the output ends and cables of the second antenna elements 142*a* and 144*a* are matched, the matching element may be omitted.

The third antenna part 150 is arranged in front of the antenna base 110 and includes a third antenna element 150*a* and a third circuit substrate 150*b*. In the present embodiment, the third antenna element 150*a* is a planar antenna (specifically a patched antenna) and receives a GNSS signal. The third circuit substrate 150*b* includes an amplifier circuit (not shown) that supports the third antenna element 150*a* and amplifies the GNSS signal received by the third antenna element 150*a*.

(Positional Relationship of Antenna Element)

Figure 6:
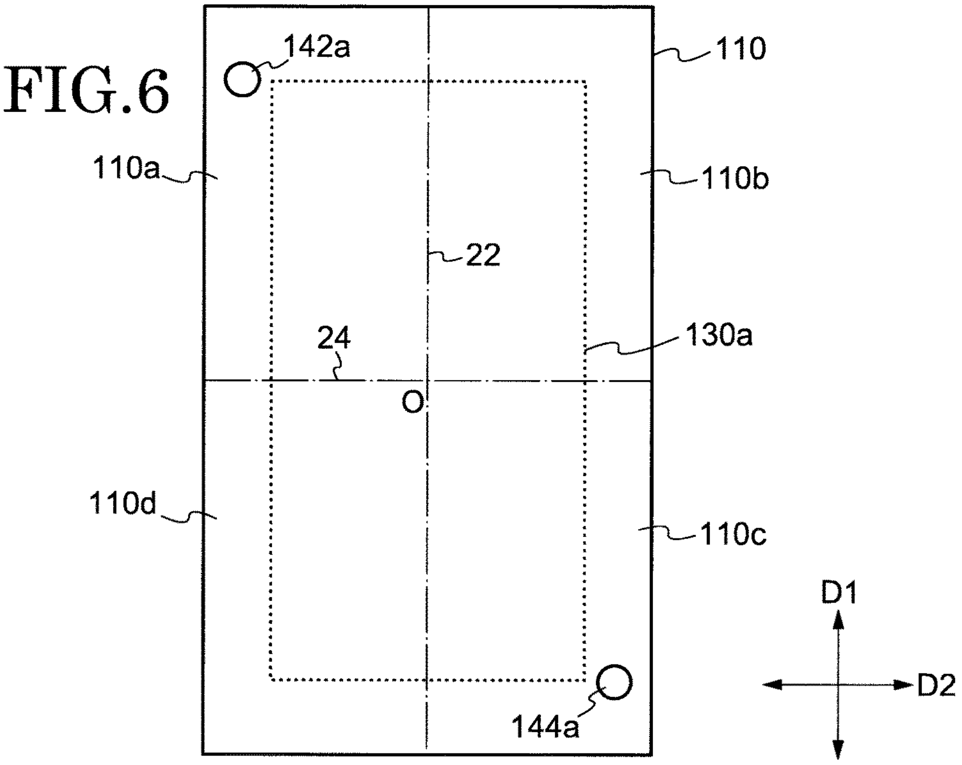
FIG. 6 is a schematic diagram for explaining a positional relationship between a first antenna element and a second antenna element in an antenna device of the first embodiment.
Figure 7:
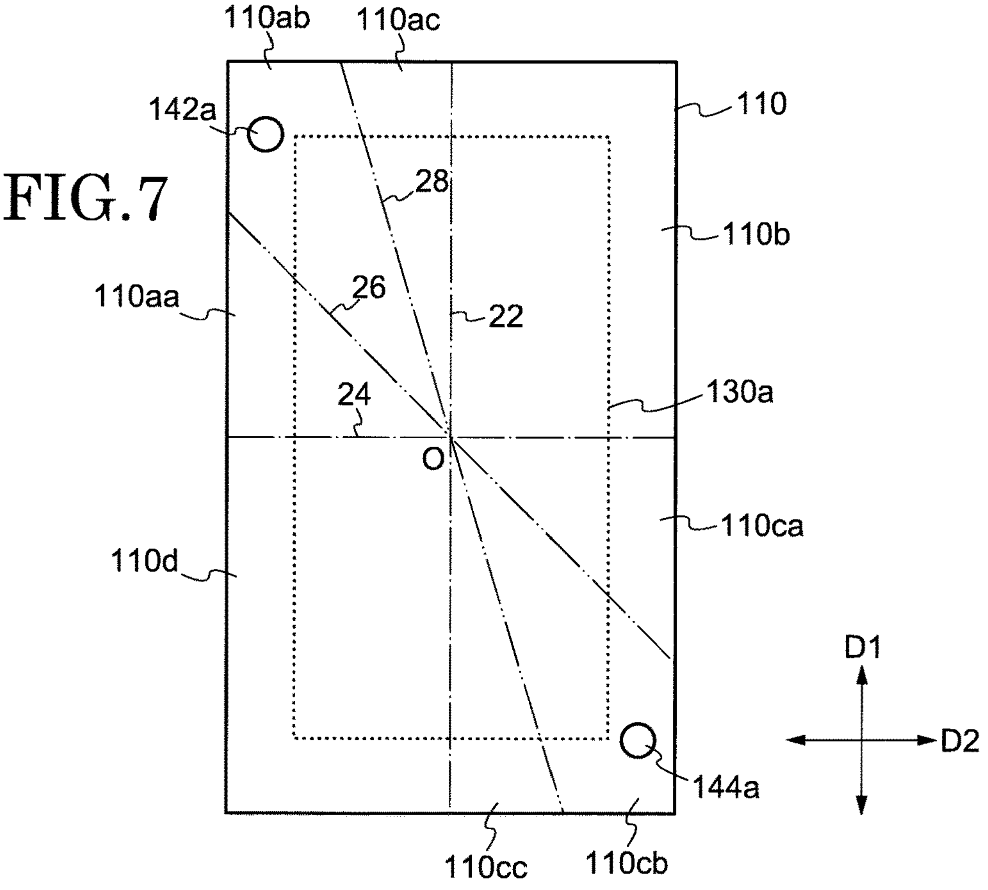
FIG. 7 is a schematic diagram for explaining a positional relationship between a first antenna element and a second antenna element in an antenna device of the first embodiment.
Figure 8:
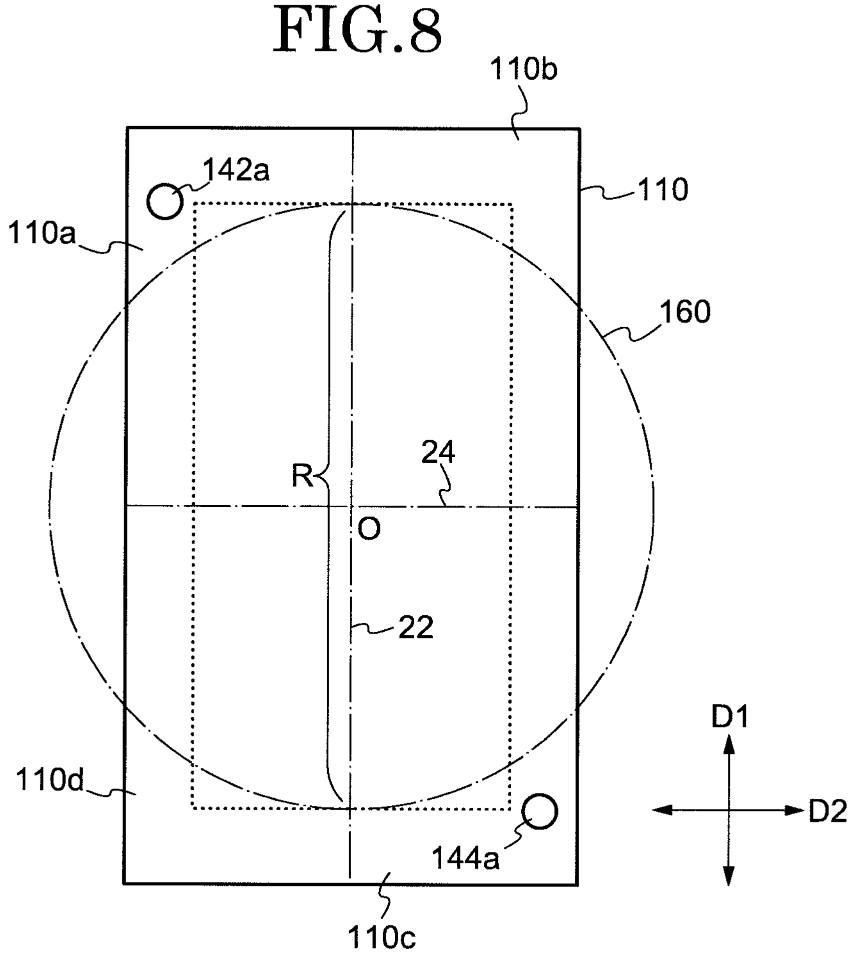
FIG. 8 is a schematic diagram for explaining a positional relationship between a first antenna element and a second antenna element in an antenna device of the first embodiment.

Next, a positional relationship of the second antenna elements 142*a* and 144*a* with respect to the first antenna element 130*a* will be described with reference to FIGS. 6 to 8. FIGS. 6 to 8 are schematic diagrams for explaining the positional relationship between the first antenna element 130*a* and the second antenna elements 142*a* and 144*a* in the antenna device 10 of the first embodiment. Specifically, it corresponds to a diagram schematically showing a plan view of the internal configuration in the antenna device 10 shown in FIG. 2.

For simplicity of illustration, in FIGS. 6 to 8, the antenna base 110 is schematically represented as a rectangular frame. The positions of the second antenna elements 142*a* and 144*a* are represented using the positions of the respective power supply points. The positions of the second antenna elements 142*a* and 144*a* are not limited to the positions of the power supply points but maybe the positions of the center or the center of gravity of the second antenna elements.

In a plan view shown in FIG. 6, the antenna base 110 is divided into four regions (a first region 110*a*, a second region 110*b*, a third region 110*c*, and a fourth region 110*d*) by a first line segment 22 and a second line segment 24 that cross each other at a center point O of the first antenna element 130*a*. The first line segment 22 is a line segment along the longitudinal direction of the antenna base 110 (D1 direction). The second line segment 24 is a line segment orthogonal to the first line segment 22.

The second antenna element 142*a* (strictly, the power supply point of the second antenna element 142*a*) is arranged in the first region 110*a* of the antenna base 110, and the second antenna element 144*a* (strictly, the power supply point of the second antenna element 144*a*) is arranged in the third region 110*c* of the antenna base 110. As shown in FIG. 6, in a plan view, both the second antenna elements 142*a* and 144*a* are arranged at positions not overlapping with the first antenna element 130*a*.

As shown in FIG. 6, the second antenna element 142*a* and the second antenna element 144*a* are located at point-symmetrical positions to the center point O of the first antenna element 130*a*. In other words, a region where one of the second antenna elements 142*a* or 144*a* is arranged is not adjacent to a region where the other antenna element is arranged. In this manner, in a plan view, by arranging one pair of second antenna elements 142*a* and 144*a* on the substantially diagonal line of the first antenna element 130*a*, the distance between the two can be made long, and electric isolation can be secured.

In the present embodiment, an example in which the second antenna element 142*a* and the second antenna element 144*a* are located at point-symmetrical positions to the center point O of the first antenna element 130*a* is shown but is not limited thereto. That is, when the second antenna element 142*a* is arranged at an arbitrary position in the first region 110*a*, it is sufficient that the second antenna element 144*a* is arranged at an arbitrary position in the third region 110*c*.

The above-described relation also holds when the antenna base 110 is further divided into a plurality of regions. For example, as shown in FIG. 7, the first region 110*a* is further divided into a plurality of regions 110*aa*, 110*ab*, and 110*ac* by a third line segment 26 and a fourth line segment 28 passing through the center point O. The third line segment 26 and the fourth line segment 28 further divide the third region 110*c* into a plurality of regions 110*ca*, 110*cb*, and 110*cc*. In this case, of the plurality of regions 110*aa*, 110*ab*, 110*ac*, 110*ca*, 110*cb*, and 110*cc*, the region 110*ab* in which the second antenna element 142*a* is arranged and the region 110*cb* in which the second antenna element 144*a* is arranged are located at positions symmetrical to the center point O.

FIG. 7 shows an example in which the second antenna element 142*a* is arranged in the region 110*ab*, but is not limited to this, and the second antenna element 142*a* may be arranged in the region 110*aa* or the region 110*ac*. Again, when the second antenna element 142*a* is arranged in the region 110*aa* (or the region 110*ac*), the second antenna element 144*a* is arranged in the region 110*ca* (or the region 110*cc*) that is symmetrical to the center point O.

However, when the second antenna element 142*a* is arranged in the region 110*aa* and the second antenna element 144*a* is arranged in the region 110*ca*, the closer the second antenna elements 142*a* and 144*a* are to the second line segment 24, the shorter the distance between the second antenna element 142*a* and the second antenna element 144*a*. Therefore, when the second antenna element 142*a* is arranged in the region 110*aa* and the second antenna element 144*a* is arranged in the region 110*ca*, it is desirable that the distance between the second antenna element 142*a* and the second antenna element 144*a* is appropriately adjusted so that it can be within a range where the isolation can be secured.

When the second antenna element 142*a* is arranged in the region 110*ac* and the second antenna element 144*a* is arranged in the region 110*cc*, the distance between the second antenna element 142*a* and the second antenna element 144*a* can be sufficiently secured. However, if the second antenna element 142*a*, the first antenna element 130*a*, and the second antenna element 144*a* are arranged on a substantially straight line along the first line segment 22, the size of the antenna device 10 in the longitudinal direction may increase.

From the above, it is preferable that the second antenna elements 142*a* and 144*a* are arranged at positions near the corners of the first antenna element 130*a* as shown in FIG. 6. The distance between the second antenna element 142*a* and the second antenna element 144*a* is preferably larger than the length of the first antenna element 130*a* in the longitudinal direction, for example. That is, as shown in FIG. 8, in a plan view, it is preferable that the second antenna elements 142*a* and 144*a* are arranged on the outer side of a circle 160 whose diameter is a length R of the first antenna element 130*a* along the first line segment 22.

FIGS. 6 to 8 show an example in which the second antenna element 142*a* is arranged in the first region 110*a* and the second antenna element 144*a* is arranged in the third region 110*c* but is not limited to this. For example, when the second antenna element 142*a* is arranged in the second region 110*b* and the second antenna element 144*a* is arranged in the fourth region 110*d*, the above-described relationship holds similarly.

So far, the positional relation between the first antenna element 130*a* and the second antenna elements 142*a* and 144*a* in a plan view has been described. Next, in FIG. 9, a positional relationship between the first antenna element 130*a* and the second antenna elements 142*a* and 144*a* in a side view will be described. The side view shown in FIG. 9 corresponds to a diagram schematically showing the vicinity where the first antenna part 130 and the second antenna part 140 are arranged in the side view showing the internal configuration of the antenna device 10 shown in FIG. 3.

Figure 9:
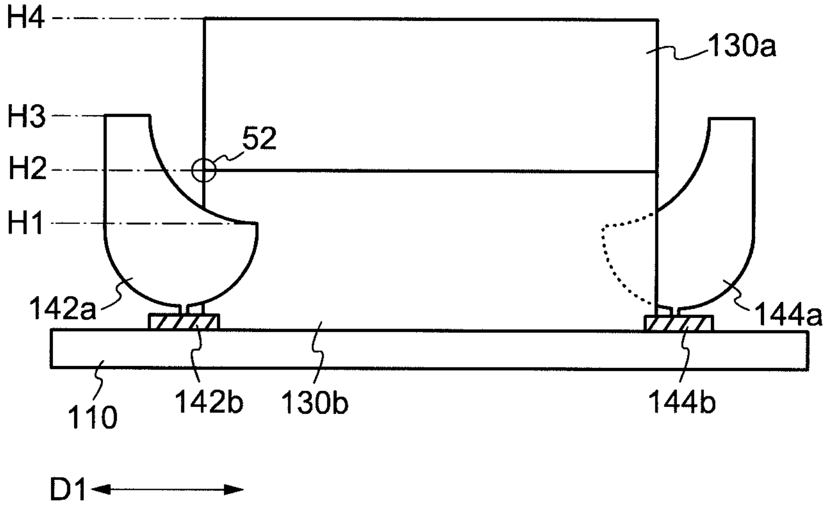
FIG. 9 is a schematic diagram for explaining a positional relationship between a first antenna element and a second antenna element in an antenna device of the first embodiment.

As shown in FIG. 9, in a side view, the first antenna element 130*a* is arranged at a position higher than the second antenna elements 142*a* and 144*a* with reference to the antenna base 110. In this case, as shown in FIG. 3 and FIG. 9, the first antenna element 130*a*, the second antenna element 142*a*, and the second antenna element 144*a* do not overlap each other in a side view seen from D2 direction (direction along the second line segment 24 shown in FIG. 6). With such a structure, the antenna device 10 of the present embodiment suppresses electrical interference between the first antenna element 130*a*, the second antenna element 142*a*, and the second antenna element 144*a* as much as possible.

To achieve the above-described structure, in the present embodiment, the shapes of the second antenna element 142*a* and the second antenna element 144*a* are devised. Specifically, the upper edges of the second antenna element 142*a* and the second antenna element 144*a* are processed to avoid the first antenna element 130*a* in a side view. Further, as shown in FIG. 2, in a plan view, both the second antenna elements 142*a* and 144*a* have surfaces that curve away from the first antenna element 130*a*. By bending in this way, it becomes easy to secure the distance between the first antenna element 130*a* and the second antenna elements 142*a* and 144*a*.

The shapes of the above-described second antenna elements 142*a* and 144*a* will be described in more detail with reference to FIG. 9. As shown in FIG. 9, the upper edges of the second antenna elements 142*a* and 144*a* are cut. That is, when the antenna base 110 is used as a reference, a height H3 of the highest point at the upper edge of the second antenna element 142*a* is between a height H2 of the lowest point and a height H4 of the highest point of the first antenna element 130*a*. A height H1 of the lowest point at the upper edge of the second antenna element 142*a* is lower than the height H2 of the lowest point of the first antenna element 130*a*.

Further, in the second antenna element 142*a* of the present embodiment, an edge connecting the height H3 of the highest point to the height H1 of the lowest point at the upper edge thereof is processed in a curved shape. With such a shape, as shown in FIGS. 3 and 9, the distance from a corner 52 on the left front side of the first antenna element 130*a* to the second antenna element 142*a* can be secured (increased).

As described above, the second antenna element 142*a* of the present embodiment has a surface curved in a plan view as shown in FIG. 2 and has a side curved in a side view as shown in FIG. 9. Thus, even if the second antenna element 142*a* is arranged near the first antenna element 130*a*, electrical interference with the first antenna element 130*a* can be minimized. Although the second antenna element 142*a* has been exemplified and described, the relationship between the second antenna element 144*a* and the first antenna element 130*a* is the same.

(Modification 1)

Modification 1 of the first embodiment will be described. In the first embodiment, although an example using the antenna for receiving AM/FM signals as the first antenna part 130 has been described, the first antenna part 130 may be a cellular antenna that receives radio waves of, for example, 750 to 960 MHz. In this case, a cellular antenna that receives radio waves of 1.7 to 5.9 GHz may be used as the second antenna part 140.

According to this modification 1, the antenna device 10 compatible with all generations of mobile communication systems of so-called 3G, 4G, and 5G.

(Modification 2)

Modification 2 of the first embodiment will be described. In the first embodiment, although an example arranging one pair of antenna elements used in the MIMO as the second antenna part 140 has been described, one pair of antenna elements used in DSRC (Dedicated Short Range Communications) may be arranged. In this case, the second antenna part 140 has a function that transmits and receives radio waves in, for example, a 5.8-GHz band and amplifies the radio waves.

(Modification 3)

Modification 3 of the first embodiment will be described. In the first embodiment, although an example using an antenna for receiving AM/FM signals as the first antenna part 130 has been described, the first antenna part 130 may be an antenna that receives signals of circularly polarized waves transmitted from satellites, such as the GNSS (Global Navigation Satellite System) signal or an SDARS (Satellite Digital Audio Radio Service) signal. For example, a patch antenna may be arranged as the first antenna part 130. Specifically, a GNSS antenna arranged as the third antenna part 150 in the first embodiment may be arranged as a patch antenna constituting the first antenna part 130. In this case, in the front side of the antenna device 10, an antenna other than the GNSS antenna, the cellular antenna may be arranged. By shortening the size of the antenna base 110 in the longitudinal direction, the antenna device 10 may be miniaturized.

Also in this modification 3, when one pair of antenna elements used in the MIMO as the second antenna part 140 (e.g., one pair of cellular antennas compatible with 5G) is arranged, it is possible to lower the correlation of the pair of antenna elements, it is possible to realize the antenna device 10 suitable for high-speed communication. The second antenna part 140 may be capable of transmitting and receiving radio waves in a frequency band partially or all higher than the first antenna part 130.

(Modification 4)

Modification 4 of the first embodiment will be described. In the first embodiment, an example in which the second antenna elements 142*a* and 144*a* are arranged in a region symmetrical to the center point O of the first antenna element 130*a* is shown. However, the present invention is not limited to such an arrangement, and the second antenna elements 142*a* and 144*a* may be arranged in a region at positions asymmetrical to the center point O of the first antenna element 130*a*.

Figure 10A:
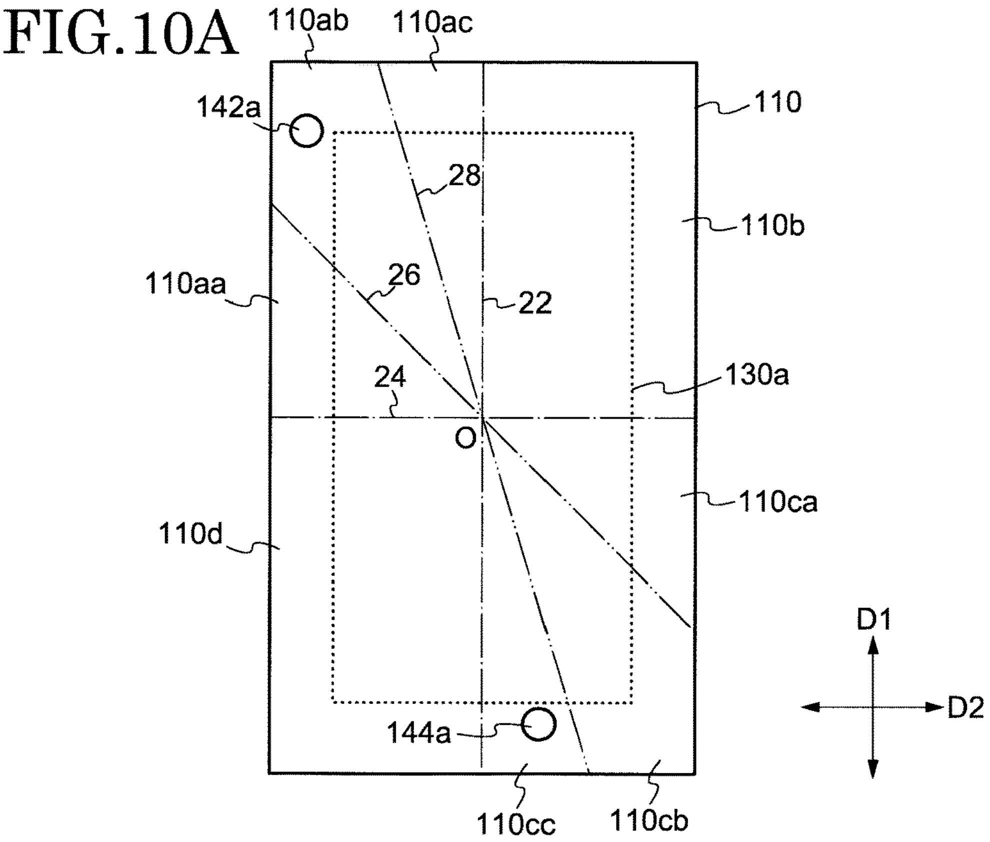
FIG. 10A and FIG. 10B are schematic diagrams for explaining positional relations between a first antenna element and a second antenna element in an antenna device of the fourth modification of the first embodiment.
Figure 10B:
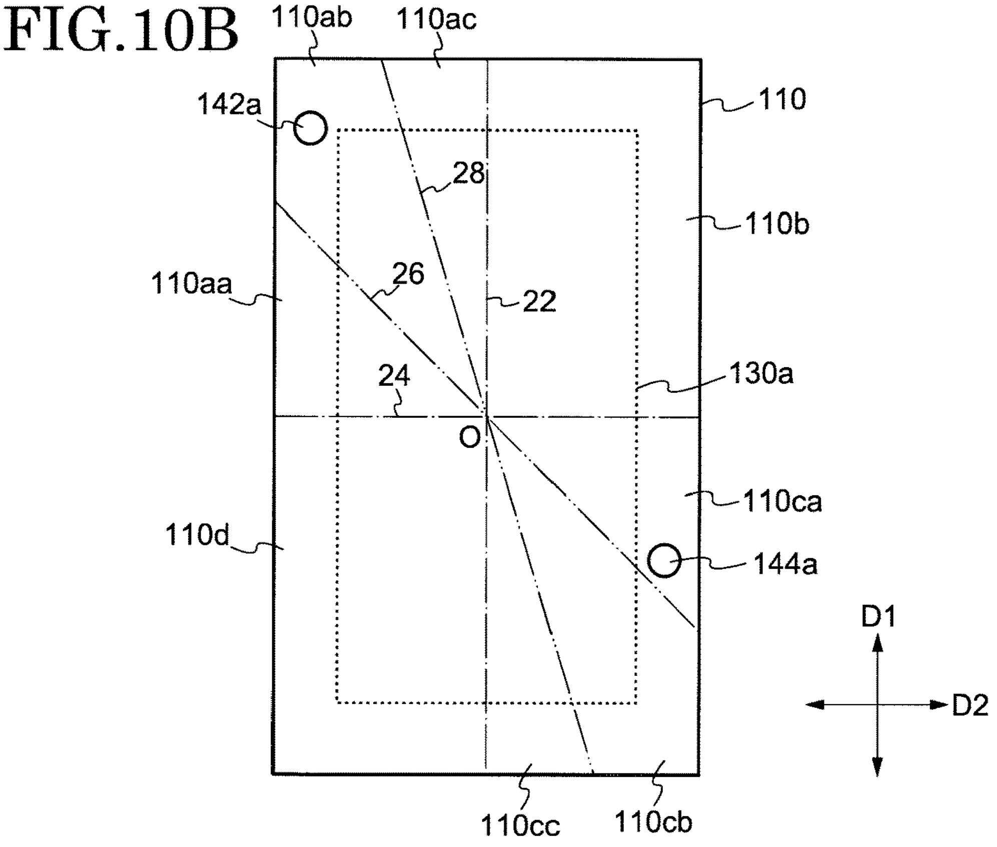

FIG. 10A and FIG. 10B are schematic diagrams for explaining a positional relation between the first antenna element 130*a* and the second antenna elements 142*a* and 144*a* in the antenna device of Modification 4 of the first embodiment.

In FIG. 10A, the second antenna element 142*a* is arranged in the region 110*ab*, and the second antenna element 144*a* is arranged in the region 110*cc*. The region 110*ab* and the region 110*cc* are regions at positions asymmetrical to the center point O. In FIG. 10B, the second antenna element 142*a* is arranged in the region 110*ab*, and the second antenna element 144*a* is arranged in the region 110*ca*. The region 110*ab* and the region 110*ca* are also regions at positions asymmetrical to the center point O. Even in the cases of FIGS. 10A and 10B, the isolation can be secured when the distance between the second antenna element 142*a* and the second antenna element 144*a* are sufficiently large.

In FIG. 10A, the second antenna element 142*a* may be arranged in the region 110*ac* and the second antenna element 144*a* may be arranged in the region 110*cb*. In FIG. 10B, the second antenna element 142*a* may be arranged in the region 110*aa* and the second antenna element 144*a* may be arranged in the region 110*cb*. Further, for example, the second antenna element 142*a* may be arranged in the region 110*ac*, and the second antenna element 144*a* may be arranged in the region 110*ca*.

As described above, when sufficient isolation can be secured between the second antenna element 142*a* and the second antenna element 144*a*, the positions at which the second antenna elements 142*a* and 144*a* are arranged can be arbitrarily determined.

Second Embodiment

Although not specifically mentioned in the first embodiment, as a method of fixing the second antenna elements 142*a* and 144*a* to the second circuit substrates 142*b* and 144*b*, respectively, for example, a method of connecting the power supply points of the second antenna elements 142*a* and 144*a* to the second circuit substrates 142*b* and 144*b* by solder welding or the like can be exemplified. However, when a strong vibration is applied to the antenna device 10, a strong load is applied to the welded portions. In this case, the welded portions may be damaged and the second antenna element 142*a* or 144*a* may fall off from the second circuit element substrate 142*b* or 144*b*. Therefore, when the second antenna elements 142*a* and 144*a* are fixed to the second circuit substrates 142*b* and 144*b*, it is desirable to reinforce the welded portions (i.e., the power supply points) of the second antenna elements 142*a* and 144*a*.

In the present embodiment, an exemplary support structure of the second antenna element when fixing the second antenna element with respect to the second circuit substrate. Elements that are the same as those described in the first embodiment are represented in the drawings using the same reference numerals, and detailed description thereof is omitted.

Figure 11:
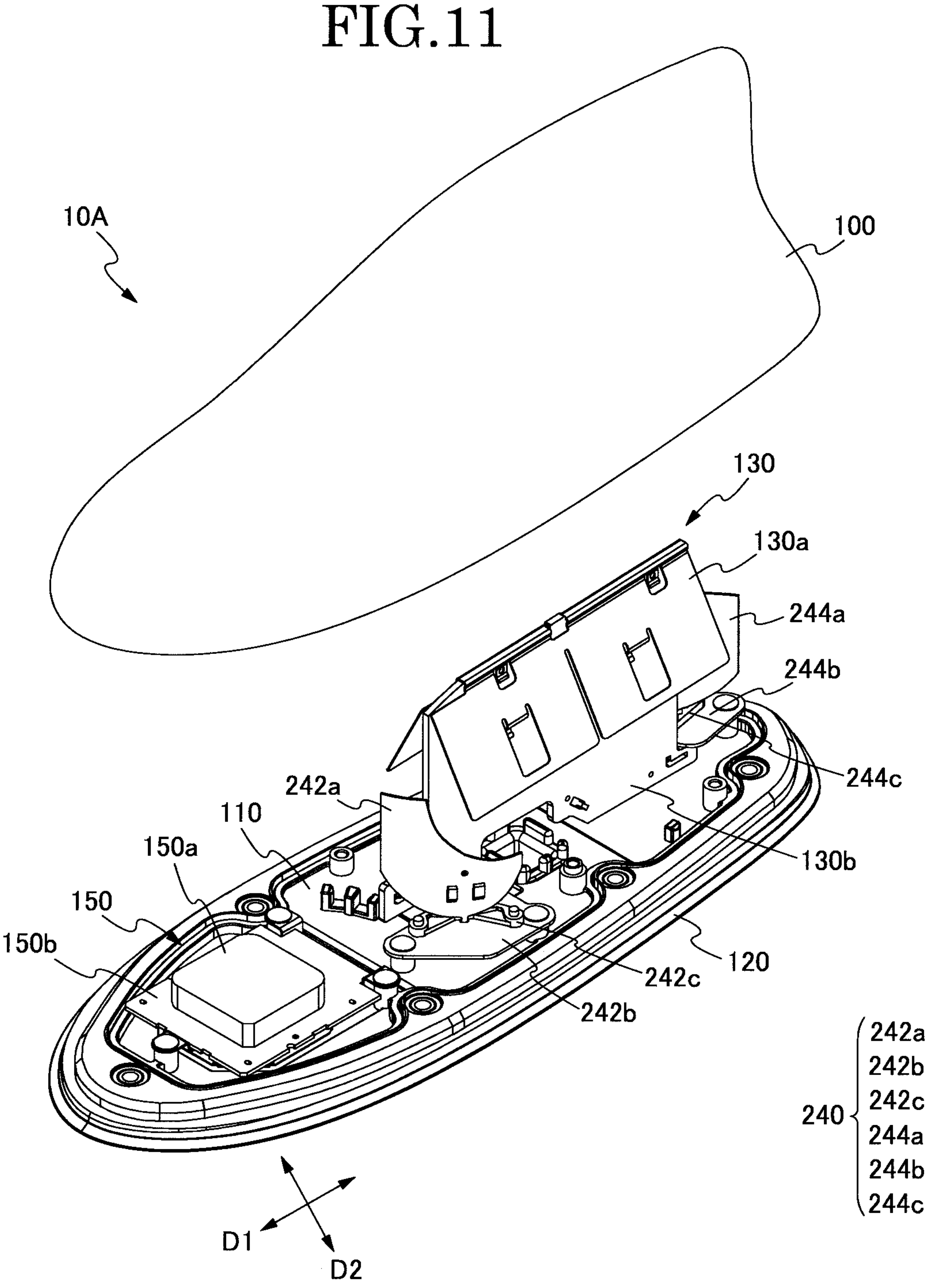
FIG. 11 is an exploded perspective view showing an internal configuration in an antenna device of the second embodiment.

FIG. 11 is an exploded perspective view showing an internal configuration of an antenna device 10A according to the second embodiment. The antenna device 10A shown in FIG. 11 differs from the antenna device 10 shown in the first embodiment in that a second antenna part 240 includes a first assembly including a second antenna element 242*a*, a second circuit substrate 242*b*, and a support member 242*c*, and a second assembly including a second antenna element 244*a*, a second circuit substrate 244*b*, and a support member 244*c*. Since the support structure of the second antenna elements 242*a* and 244*a* are the same, the following explanation focuses on the support structure of the second antenna element 242*a*.

As in the first embodiment, the second antenna element 242*a* is directly fixed to the second circuit substrate 242*b* by solder welding or the like. Further, the second antenna element 242*a* of the present embodiment is supported by the support member 242*c* fixed on the second circuit substrate 242*b*. That is, in the present embodiment, the welded portion of the second antenna element 242*a* is reinforced by the support member 242*c*.

Figure 12A:
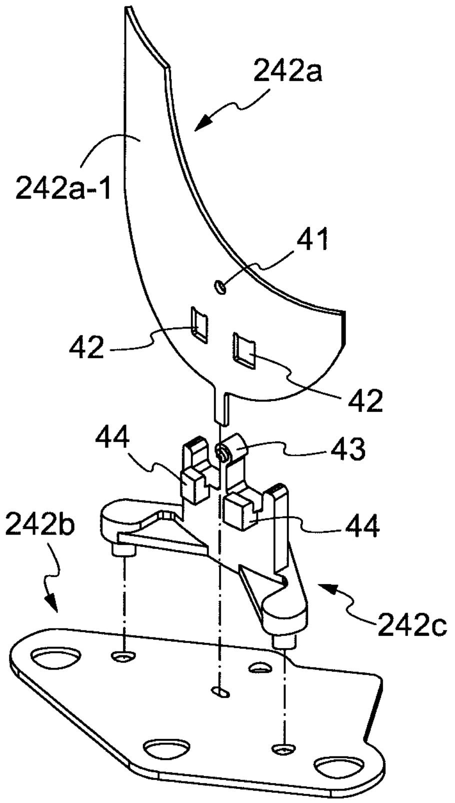
FIG. 12A, FIG. 12B, FIG. 12C and FIG. 12D are diagrams for explaining a specific support structure of a second antenna element in an antenna device of the second embodiment.
Figure 12B:
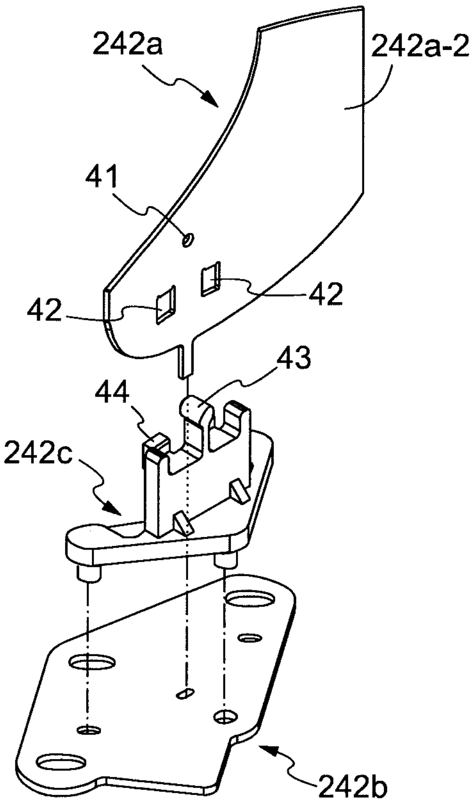
Figure 12C:
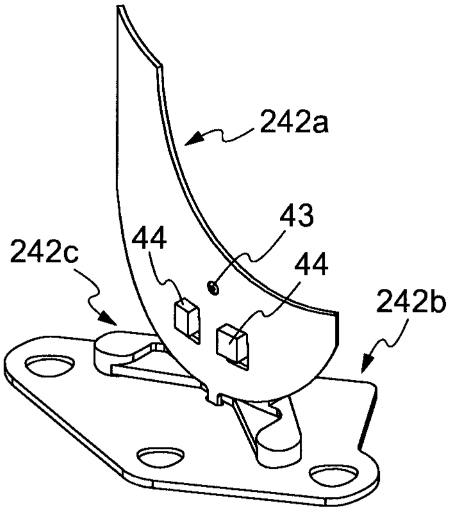
Figure 12D:
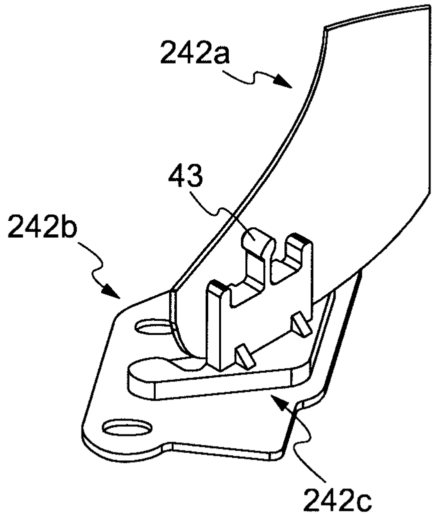

FIG. 12A, FIG. 12B, FIG. 12C and FIG. 12D are diagrams for explaining a specific support structure of the second antenna element 242*a* in the antenna device 10A of the second embodiment. Specifically, FIG. 12A is an exploded perspective view of the second antenna element 242*a* as viewed from a first surface 242*a*-1. FIG. 12B is an exploded perspective view of the second antenna element 242*a* as viewed from the side of a second surface 242*a*-2 opposite to the first surface 242*a*-1. FIGS. 12C and 12D show how the second antenna element 242*a*, the second circuit substrate 242*b*, and the support member 242*c* shown in FIGS. 12A and 12B are assembled, respectively. The second surface (inner curved surface) 242*a*-2 corresponds to a surface facing the first circuit substrate 130*b*.

As shown in FIGS. 12A and 12B, the second antenna element 242*a* includes a first opening 41 and two second openings 42. In the present embodiment, the shape of the first opening 41 is circular, the shape of the second openings 42 is square. However, the shapes of the first opening 41 and the second openings 42 are not limited to these examples. For example, the shape of the first opening may be elliptical or polygonal. The shape of the second openings may be a polygon other than a square or maybe a circle or an ellipse.

In the present embodiment, the support member 242*c* is a plastic member having a first support member 43 and two second support members 44. As shown in FIGS. 12C and 12D, a part of the first support member 43 is inserted into the first opening 41 from the second surface 242*a*-2 side of the second antenna element 242*a*. The second support member 44 is inserted into the second opening 42 from the second surface 242*a*-2 side of the second antenna element 242*a*, and then contacts with the first surface 242*a*-1.

The second support members 44 have an L-shaped cross-section and function as a hook. Specifically, as shown in FIG. 12C, after the second support member 44 is inserted into the second opening 42, the second antenna element 242*a* is moved downward relative to the support member 242*c*. As a result, the second antenna element 242*a* is configured to be hooked on the second support member 44.

In this condition, when the first support member 43 is inserted into the first opening 41, the second support member 44 contacts with the first surface 242*a*-1, and the first support member 43 and the second support members 44 can sandwich and fix the second antenna element 242*a*. Further, in the second antenna part 240 in the antenna device 10A of the present embodiment, the movement in the vertical direction, the left-right direction, and the oblique direction is limited by the first support member 43, and the movement in the rotational direction of the second antenna element 242*a* is limited by the two second support members 44. In this manner, the second antenna part 240 is limited in motion in all directions by the support member 242*c*.

The support member 242*c* is fixed to the second circuit substrate 242*b* by heat caulking, screwing, or the like. The second antenna element 242*a* is fixed to the second circuit substrate 242*b* by solder welding or the like.

As described above, in the present embodiment, by using the support member 242*c*, a support structure for reinforcing the welded portion of the second antenna element 242*a* is realized. In the present embodiment, in the support structure using the support member 242*c*, the center of gravity of the second antenna element 242*a* is considered. This point will be described with reference to FIGS. 13A and 13B.

Figure 13A:
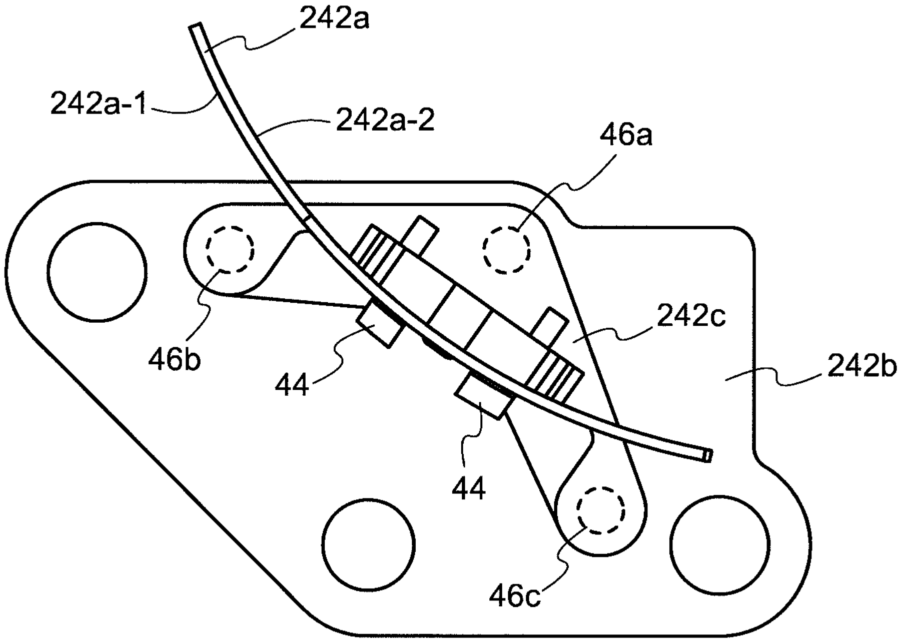
FIG. 13A and FIG. 13B are diagrams for explaining a support structure of an antenna device of the second embodiment.
Figure 13B:
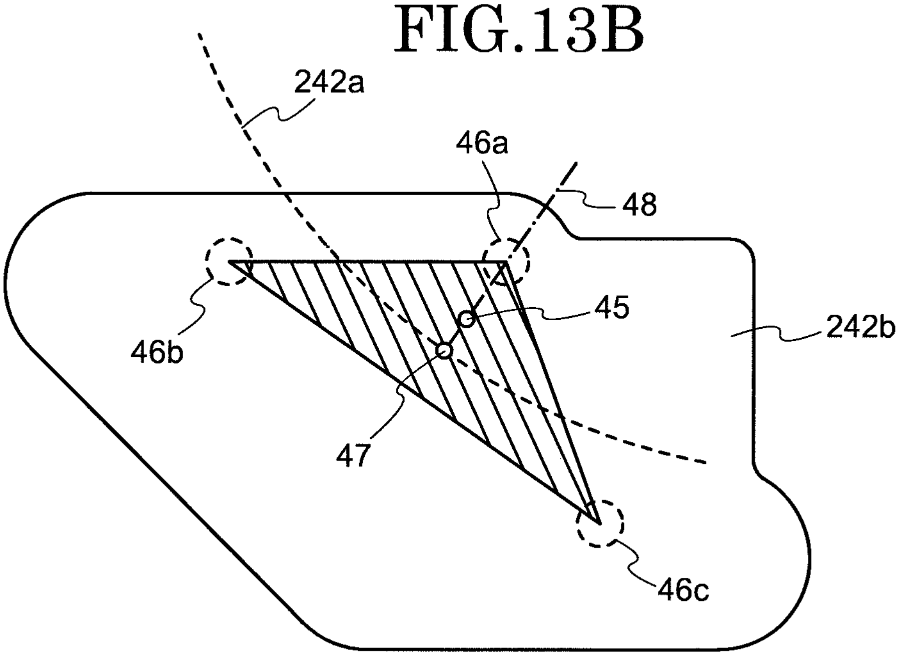

FIG. 13A and FIG. 13B are diagrams for explaining a support structure of the antenna device 10A according to the second embodiment. Specifically, FIG. 13A is a plan view showing a configuration of the second antenna part 240 in the antenna device 10A of the second embodiment. FIG. 13B is a schematic diagram showing a positional relation between a center of gravity 45 of the second antenna element 242*a* and fixing points 46*a* to 46*c* of the support member 242*c* in the antenna device 10A of the second embodiment.

As shown in FIG. 13A, the support member 242*c* of the present embodiment is fixed to the second circuit substrate 242*b* at three points. In a plan view, the fixing point 46*a* is located on the second surface 242*a*-2 side with reference to the second antenna element 242*a*. On the other hand, the fixing points 46*b* and 46*c* are located on the first surface 242 *a*-1 side. That is, the bottom portion of the support member 242*c* has a substantially V-shape that bends at the fixing point 46*a*, and in a plan view, the fixing point 46*a* and the other fixing points 46*b* and 46*c* are located on different sides each other with reference to the second antenna element 242*a*.

From another point of view of the above-described configuration, as shown in FIG. 13B, in the present embodiment, a power supply point (welded portion) 47 of the second antenna element 242*a* is located within a range inside the triangle connecting the fixing points 46*a*, 46*b*, and 46*c* of the support member 242*c*. As described above, in the present embodiment, in a plan view, it is configured such that the line segment connecting the fixing point 46*a* and the fixing point 46*b* and the line segment connecting the fixing point 46*a* and the fixing point 46*c* intersect the second antenna element 242*a*.

In this case, the fixing point 46*a* located on the second surface 242*a*-2 side is provided on the side where the center of gravity 45 of the second antenna element 242*a* is located. Specifically, the fixing point 46*a* of the present embodiment is located on an extension line 48 of the line segment connecting the power supply point 47 and the center of gravity 45 of the second antenna element 242*a*. On the contrary, the fixing points 46*b* and 46*c* located on the first surface 242*a*-1 side are provided on the side where the center of gravity 45 of the second antenna element 242*a* does not locate.

According to the findings of the present inventors, the load on the welded portion of the antenna with respect to the circuit substrate can be reduced by fixing a portion close to the center of gravity of the antenna. Based on this knowledge, the antenna device 10A of the present embodiment has a configuration in which the fixing point 46*a* of the support member 242*c* is arranged at a position close to the center of gravity 45 of the second antenna element 242*a*. In the present embodiment, by using the support structure described above, the load applied to the power supply point 47 of the second antenna element 242*a* (i.e., the welded portion) is reduced. As a result, the antenna device 10A of the present embodiment can prevent the second antenna element 242*a* from falling off from the second circuit substrate 242*b* due to vibration or the like.

The support structure of the present embodiment is particularly effective as a support structure of a member having a curved surface. That is, the support structure described in the present embodiment is particularly effective as a structure for fixing the antenna having a curved surface as in the second antenna element 242*a* of the present embodiment.

(Modification 1)

Modification 1 of the second embodiment will be described. The support structure of the second embodiment can be applied to, for example, a flat antenna element in which the second antenna element 242*a* does not have a curved surface. In this case, the position of the center of gravity 45 of the second antenna element 242*a* overlaps with the second antenna element 242*a* in a plan view. In such a case, the position of the fixed point 46*a* of the support member 242*c* may be made closer to the second antenna element 242*a* than in the examples shown in FIGS. 13A and 13B. The support structure of the second embodiment is not limited to a flat antenna element but may be applied to an antenna element of V-shaped or chevron shape (shape having a bent plane), jagged shape (shape in which a plurality of chevron shapes are continuous), or a wavy shape (shape in which a plurality of curved surfaces are continuous).

(Modification 2)

Modification 2 of the second embodiment will be described. In the example shown in FIGS. 13A and 13B, the fixing point 46*a* is arranged on the extension line 48 of the line segment connecting the power supply point 47 and the center of gravity 45 of the second antenna element 242*a* but is not limited to this. That is, the fixed point 46*a* may be arranged at a position as close as possible to the center of gravity 45. In other words, as shown in FIG. 13B, the fixing point 46*a* may be arranged on the side where the center of gravity 45 is located with reference to the second antenna element 242*a*. Even in this case, it is desirable to arrange the fixing point 46*a* as close to the center of gravity 45 as possible.

(Modification 3)

Modification 3 of the second embodiment will be described. In the example shown in FIGS. 13A and 13B, the support member 242*c* is fixed to the second circuit substrate 242*b* at three points, but the present invention is not limited to this example. The support member 242*c* may be fixed using four or more fixing points. Also, in this case, it is desirable that at least one fixing point is arranged in the vicinity of the center of gravity 45 of the second antenna element 242*a*.

(Modification 4)

Modification 4 of the second embodiment will be described. The second antenna element 242*a* is supported by the support member 242*c* after the second antenna element 242*a* is fixed to the second substrate 242*b*. However, the present invention is not limited to this example, and a member in which the second circuit substrate 242*b* and the support member 242*c* are integrated may be used. For example, if an element included in the second circuit substrate 242*b* (e.g., a matching element or the like) is mounted on the support member 242*c*, the second circuit substrate 242*b* can be omitted.

If the signals received by the second antenna element 242*a* can be transmitted to the first circuit substrate 130*b* and processed without passing through a matching element or the like, the second circuit substrate 242*b* can be omitted.

As described above, in the present embodiment, the second circuit substrate 242*b* is not an indispensable configuration. Accordingly, it is possible to directly fix the support member 242*c* to the antenna base 110 to support the second antenna element 242*a*.

While the present invention has been described with reference to the drawings, the present invention is not limited to the above embodiments and can be appropriately modified without departing from the spirit of the present invention. The above-described embodiments and modifications can be combined as long as there is no particular technical contradiction.

What is claimed is:

1. An antenna device comprising:

an antenna base having a longitudinal direction;

a first antenna element on the antenna base; and a pair of second antenna elements on the antenna base, the pair of second antenna elements being capable of transmitting and receiving radio waves in a higher frequency band than the first antenna element, wherein in a planar view, when the antenna base is divided into four regions by a first line segment along the longitudinal direction and a second line segment orthogonal to the first line segment intersecting each other at the center point of the first antenna element, a region where one of the pair of second antenna elements is located is not adjacent to a region where the other of the pair of second antenna elements is located, and the height of the highest point at the upper edge of each of the pair of second antenna elements is between the lowest and highest points of the first antenna element, and the height of the lowest point at the upper edge of each of the pair of second antenna elements is below the lowest point of the first antenna element with respect to the antenna base.

2. The antenna device according to claim 1, wherein when four regions are further divided into a plurality of regions by other line segments passing through the center point, a region in which one of the pair of second antenna elements is located and a region in which the other of the pair of second antenna elements is located are symmetrically located with respect to the center point.

3. The antenna device according to claim 1, wherein in a planar view, each of the pair of second antenna elements is located outside of a circle having a diameter equal to the length of the first antenna element along the first line segment.

4. The antenna device according to claim 1, wherein the first antenna element is an antenna element extending in the longitudinal direction.

5. The antenna device according to claim 1, wherein each of the pair of second antenna elements is not overlapped by the first antenna element in a side view from the direction along the second line segment.

6. The antenna device according to claim 1, wherein in a planar view, each of the pair of second antenna elements has a surface curving away from the first antenna element.

7. The antenna device according to claim 1, wherein each of the pair of second antenna elements is a tapered antenna.

8. The antenna device according to claim 1, wherein each of the pair of second antenna elements transmits and receives radio waves in the same frequency band as each other.

9. The antenna device according to claim 1, wherein the pair of second antenna elements is used for MIMO.

10. The antenna device according to claim 1, further comprising: support members each supporting each of the pair of second antenna elements, wherein each of the support members is fixed to at least three fixing points including a first fixing point, a second fixing point and a third fixing point, and in a planar view, the first fixing point in a support member supporting one of the pair of second antenna elements is located on a side on which the center of gravity of one of the pair of second antenna elements exists with respect to one of the pair of second antenna elements.

11. The antenna device according to claim 10, wherein the first fixing point is located on an extension of a line segment connecting a power supply point of one of the pair of second antenna elements and the center of gravity.

12. The antenna device according to claim 10, wherein in a planar view, a line segment connecting the first fixing point and the second fixing point and a line segment connecting the first fixing point and the third fixing point intersect with one of the pair of second antenna elements.

13. The antenna device according to claim 1, further comprising: support members each supporting each of the pair of second antenna elements, wherein each of the support members is fixed to at least three fixing points including a first fixing point, a second fixing point and a third fixing point, and in a planar view, the first fixing point in a support member supporting one of the pair of second antenna elements is located on a side of the inner curved surface of one of the pair of second antenna elements with respect to one of the pair of second antenna elements.

14. An antenna device comprising:

an antenna base having a longitudinal direction;

a first antenna element on the antenna base; and a pair of second antenna elements on the antenna base, the pair of second antenna elements being capable of transmitting and receiving radio waves in a frequency band that is partially or fully higher than the first antenna element, wherein in a planar view, when the antenna base is divided into four regions by a first line segment along the longitudinal direction and a second line segment orthogonal to the first line segment intersecting each other at the center point of the first antenna element, a region where one of the pair of second antenna elements is located is not adjacent to a region where the other of the pair of second antenna elements is located, and the height of the highest point at the upper edge of each of the pair of second antenna elements is between the lowest and highest points of the first antenna element, and the height of the lowest point at the upper edge of each of the pair of second antenna elements is below the lowest point of the first antenna element with respect to the antenna base.

15. The antenna device according to claim 14, wherein when four regions are further divided into a plurality of regions by other line segments passing through the center point, a region in which one of the pair of second antenna elements is located and a region in which the other of the pair of second antenna elements is located are symmetrically located with respect to the center point.

16. The antenna device according to claim 14, wherein in a planar view, each of the pair of second antenna elements is positioned outside of a circle having a diameter equal to the length of the first antenna element along the first line segment.

17. The antenna device according to claim 14, wherein the first antenna element is an antenna element receiving circularly polarized signals.

18. The antenna device according to claim 14, wherein the pair of second antenna elements is used for MIMO.

* * * * *